(12) United States Patent
Kim et al.

(10) Patent No.: US 8,004,801 B2
(45) Date of Patent: Aug. 23, 2011

(54) APPARATUS FOR DECREASING INRUSH CURRENT USING SFCL AND METHOD FOR DECIDING OPTIMAL INSERTION RESISTANCE

(75) Inventors: Chul-hwan Kim, Seongnam-si (KR);
Hun-chul Seo, Pohang-si (KR);
Sang-bong Rhee, Suwon-si (KR)

(73) Assignee: SUNGKYUNKWAN University Foundation for Corporate Collaboration (KR)

( * ) Notice: Subject to any disclaimer, the term of this patent is extended or adjusted under 35 U.S.C. 154(b) by 528 days.

(21) Appl. No.: 12/220,904

(22) Filed: Jul. 29, 2008

(65) Prior Publication Data

US 2009/0273875 A1    Nov. 5, 2009

(30) Foreign Application Priority Data

Apr. 30, 2008    (KR) ........................ 10-2008-0040407

(51) Int. Cl.
*H02H 7/00* (2006.01)
*H02H 9/00* (2006.01)
*H02H 9/08* (2006.01)
*H02H 3/08* (2006.01)
*H02H 9/02* (2006.01)

(52) U.S. Cl. .......................... 361/19; 361/93.1; 361/93.9
(58) Field of Classification Search ................... 361/19
See application file for complete search history.

(56) References Cited

U.S. PATENT DOCUMENTS

2009/0190274 A1* 7/2009 Ko et al. ........................ 361/19

FOREIGN PATENT DOCUMENTS

KR    10-0624496    9/2006

* cited by examiner

*Primary Examiner* — Dharti H Patel
(74) *Attorney, Agent, or Firm* — Ballard Spahr LLP

(57) ABSTRACT

There is provided an apparatus for decreasing an inrush current which comprises a power system including a transformer, and a superconducting fault current limiter electrically connected to the transformer. A resistance value of the superconducting fault current limiter is calculated by using a variation of the inrush current and a variation of the voltage drop of the power system according to a value of insertion resistance. In the apparatus for decreasing the inrush current, the optimal resistance value considering both the decrease rate of the inrush current and the voltage drop by the insertion of the superconducting fault current limiter is decided as the resistance value of the superconducting fault current limiter. Accordingly, the power system is efficiently operated depending on the characteristics of the power system in which the superconducting fault current limiter is installed.

13 Claims, 6 Drawing Sheets

APPARATUS FOR DECREASING INRUSH CURRENT USING SFCL AND METHOD FOR DECIDING OPTIMAL INSERTION RESISTANCE

CROSS-REFERENCE TO RELATED APPLICATION

This application claims the benefit of Korean Patent Application No. 2008-0040407, filed Apr. 30, 2008, the disclosure of which is hereby incorporated herein by reference in its entirety.

BACKGROUND OF THE INVENTION

1. Technical Field

The present invention relates to an apparatus for decreasing an inrush current generated when power is put into a transformer, by using a superconducting fault current limiter (SFCL), and a method for deciding the optimal insertion resistance.

More particularly, the present invention relates to an apparatus for optimally decreasing an inrush current of a transformer by deciding the optimal insertion resistance of an SFCL by using the inrush current and voltage before the SFCL is inserted, and a method for deciding the optimal insertion resistance.

2. Discussion of Related Art

In a transformer which is widely used as a key device of electric installation in an industry and at home, an inrush current is generated by the hysteresis characteristic of an iron core within the transformer at the moment when power is put into the transformer.

The inrush current is most influenced by residual magnetic flux which remains in the iron core when turning on and off the power of the transformer. In generally, at the point in time when the power is input, the inrush current increases as the phase of a voltage waveform is close to zero degree and the residual magnetic flux density is greater.

Since the inrush current has rich high harmonics and is from a few to several tens times a normal current in intensity as the case may be, it has seriously adverse effects on the power system, such as malfunction of a protective relay, damage of a transformer, shortening of a transformer life, and the like.

To solve the aforementioned problems, the prior art uses a method for delaying in time for inputting power applied to a transformer by each phase (hereinafter, referred to as a "first method") and a method for increasing impedance by using a pre-insertion reactor (hereinafter, referred to as a "second method"). An example of the second method is disclosed in detail in Korean Laid-Open Patent Application No. 2004-62938.

However, in the aforementioned conventional first method, whenever power is put into a transformer, setting a proper delay time needs to be always controlled. Moreover, since a speed at which the inrush current decreases is not fast, the power installation is insufficiently protected at the beginning when the inrush current is generated.

Further, in the conventional second method, since the pre-insertion reactor is connected to or separated from a transformer by switching operation, a switching device has an over-voltage. Moreover, when the switching device is used for a long time, it ages to cause a problem regarding reliability of the power system.

Consequently, there has been a demand for a new method which fast decreases the inrush current and needs no special controlling or switching operation when the connection to a transformer is completed.

SUMMARY OF THE INVENTION

Therefore, the present invention is directed to provide an apparatus for decreasing an inrush current by using a superconducting fault current limiter (SFCL) which is capable of decreasing, within a short time of a few to several tens milliseconds, the inrush current generated when power is put into a transformer.

Another object of the present invention is to provide an apparatus for decreasing an inrush current by using the SFCL which needs no special controlling or switching operation after being installed in a power system.

Another object of the present invention is to provide a method for deciding optimal insertion resistance of the SFCL which is used for decreasing the inrush current, based on the features of the power system.

In accordance with an aspect of the present invention, there is provided an apparatus for decreasing an inrush current by using an SFCL, comprising: a power system including a transformer; and a superconducting fault current limiter electrically connected to the transformer and decreasing the inrush current generated in the power system.

Then, a value of insertion resistance of the superconducting fault current limiter is calculated by using a variation curve of the inrush current in the power system according to the insertion resistance and a variation curve of voltage drop according to the insertion resistance.

The value of the insertion resistance is a resistance value at a crossing point of the variation curve of the inrush current according to the insertion resistance and the variation curve of the voltage drop according to the insertion resistance.

The value of the insertion resistance is a resistance value at a crossing point of the variation curve of the inrush current according to the insertion resistance and the variation curve of the voltage drop according to the insertion resistance.

The crossing point is a crossing point of a variation curve of a corrected inrush current obtained by multiplying the variation curve of the inrush current according to the insertion resistance by a given scale factor and the variation curve of the voltage drop according to the insertion resistance.

The variation curve of the inrush current and the variation curve of the voltage drop are solved by using the inrush current and bus voltage of the power system before the superconducting fault current limiter is inserted.

The scale factor is solved by using the inrush current and bus voltage of the power system before the superconducting fault current limiter is inserted.

In accordance with another aspect of the present invention, there is provided a method for deciding a value of insertion resistance of a superconducting fault current limiter for decreasing an inrush current of a power system, comprising: a first step of solving a variation curve of the inrush current of the power system and a variation curve of voltage drop according to insertion resistance of the superconducting fault current limiter; and a second step of solving a value of insertion resistance of the superconducting fault current limiter by using the variation curve of the inrush current and the variation curve of the voltage drop.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein.

Figure 1:
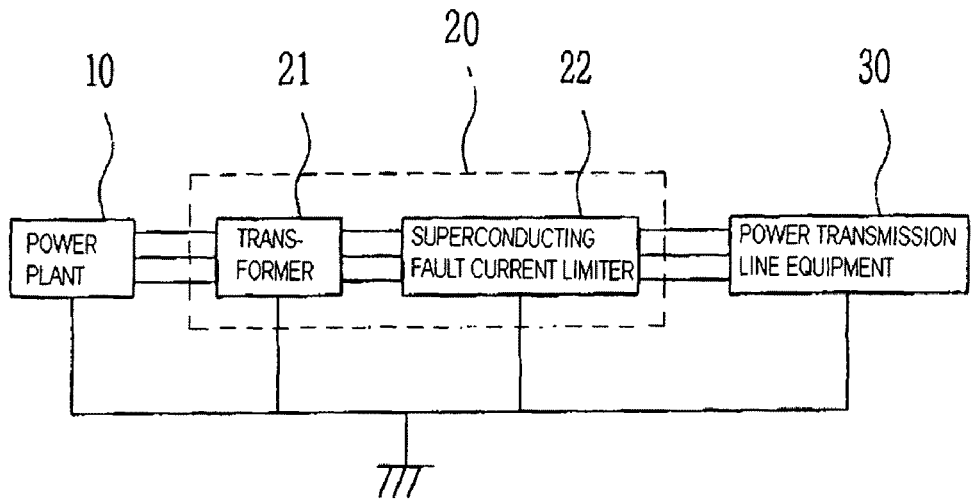
FIG. 1 is a schematic view illustrating the structure of a power system in which an apparatus for decreasing an inrush current by using a superconducting fault current limiter (SFCL) is installed in accordance with an embodiment of the present invention.

FIG. 1 is a schematic view illustrating the structure of a power system in which an apparatus for decreasing an inrush current by using a superconducting fault current limiter (SFCL) is installed in accordance with an embodiment of the present invention.

In the power system of FIG. 1, a power plant 10, a transformer substation 20 and power transmission line equipment 30 are sequentially connected to one another. In the transformer substation 20, there are provided a transformer 21 and a SFCL 22. The transformer 21 boosts the voltage of electricity transmitted from the power plant 10 to be a power transmission voltage. The SFCL 22 is to decreases an inrush current generated in the transformer 21.

The SFCL 22 which is an electric device using a superconductor protects the machinery and tools of the power system by decreasing an over-current generating when there occurs a fault, such as the falling of a thunderbolt, an earth fault, a short circuit, or the like.

Since the SFCL 22 limits the fault current within a few to several tens milliseconds, it increases the capacity of a circuit breaker, reduces the extension of a power line and eases the standards of an electric device, to significantly improve the flexibility, stability and reliability of the power system.

In general, the SFCL 22 is a kind of a current limiter using the properties of the superconductor in that when a current is below a threshold current, a resistance value is zero but when the current is in excess of the threshold current, it increases by the quenching characteristics, to limit the current. Since this technology is well-known before the present application is filed, no further description thereof will be presented.

The apparatus for decreasing the inrush current according to the embodiment of the present invention is to decrease the inrush current by using the properties of the SFCL 22, and the resistance value of the SFCL 22 is determined according to a method for deciding the optimal insertion resistance to be described later.

The apparatus for decreasing the inrush current by using the SFCL 22 according to the embodiment of the present invention has the advantage of promptly decreasing the inrush current generated at the beginning when the power is put into the transformer 21, due to the characteristic of the superconductor in that the resistance value increases within a few to several tens milliseconds when the current is in excess of the threshold current.

Furthermore, like the constitution of FIG. 1, when the SFCL 22 is installed at one side of the transformer 21, no special controlling or switching operation is needed. Therefore, the power system is easily managed and the reliability of the power system is easily secured.

Figure 2:
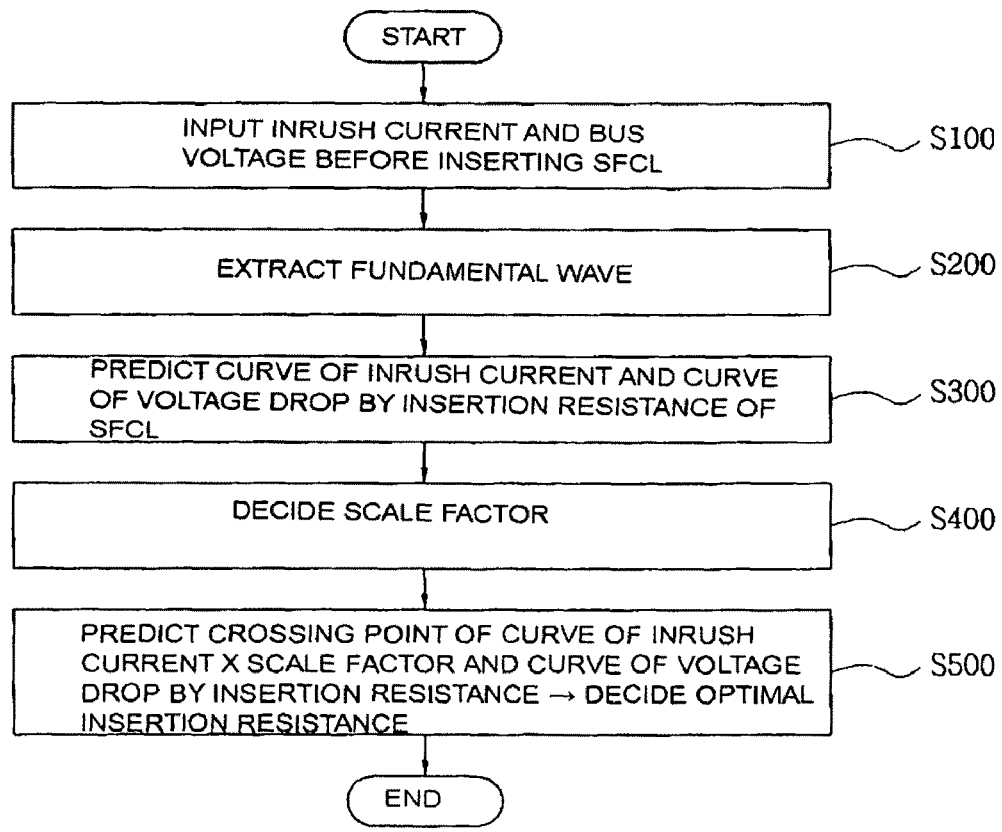
FIG. 2 is a flow chart illustrating a method for deciding the optimal insertion resistance of the SFCL installed in FIG. 1.

FIG. 2 is a flow chart illustrating a method for deciding the optimal insertion resistance of the SFCL according to the embodiment of the present invention.

Steps S100 and S200 extract fundamental waves of an inrush current generated when the SFCL 22 is not connected to the power system and a bus voltage of the power system. The phasor representations for the values of the two fundamental waves components are respectively written as:

$$I_{inrush} = |I_{inrush}| \angle \theta_{I\_inrush} \quad \text{[Formula 1]}$$

$$V_{inrush} = |V_{inrush}| \angle \theta_{V\_inrush} \quad \text{[Formula 2]}$$

The equivalent impedance and complex power of the power system which are solved by using [Formula 1] and [Formula 2] are respectively given by:

$$z_{inrush} = \frac{V_{inrush}}{I_{inrush}} = \frac{|V_{inrush}|}{|I_{inrush}|} \angle \theta_{V\_inrush} - \theta_{I\_inrush} \quad \text{[Formula 3]}$$

$$s = V_{inrush} I^*_{inrush} = |V_{inrush}||I_{inrush}| \angle \theta_{V\_inrush} - \theta_{I\_inrush} \quad \text{[Formula 4]}$$

Step S300 predicts a curve of the inrush current by the insertion resistance of the SFCL 22 and a curve of voltage drop by the insertion resistance by using the inrush current and the bus voltage.

When the SFCL 22 is connected to the power system, the total impedance is given by:

$$Z_{total} = R_{SFCL} + Z_{inrush} \quad \text{[Formula 5]}$$

Assuming that the complex power is constant after the SFCL 22 is connected to the power system, then the inrush current is given by:

$$I_{SFCL} = \sqrt{\frac{S}{Z_{total}}} = \sqrt{\frac{|V_{inrush}||I_{inrush}| \angle \theta_{V\_inrush} - \theta_{I\_inrush}}{R_{SFCL} + \frac{|V_{inrush}|}{|I_{inrush}|} \angle \theta_{V\_inrush} - \theta_{I\_inrush}}} \quad \text{[Formula 6]}$$

The phasor representations for [Formula 6] are respectively written as:

$$|I_{SFCL}| = \sqrt{\frac{|V_{inrush}||I_{inrush}|}{\left(R_{SFCL} + \frac{|V_{inrush}|}{|I_{inrush}|}\cos(\theta_{V\_inrush} - \theta_{I\_inrush})\right)^2 + \left(\frac{|V_{inrush}|}{|I_{inrush}|}\sin(\theta_{V\_inrush} - \theta_{I\_inrush})\right)^2}}$$ [Formula 7]

$$\angle I_{SFCL} = \sqrt{\tan^{-1}\frac{\angle\theta_{V\_inrush} - \theta_{I\_inrush}}{R_{SFCL} + \frac{|V_{inrush}|}{|I_{inrush}|}\sin(\theta_{V\_inrush} - \theta_{I\_inrush})}}$$ [Formula 8]

The voltage drop by the insertion resistance of the SFCL 22 is given by:

$$V_{SFCL\_drop} = |I_{SFCL}|R_{SFCL}$$ [Formula 9]

Accordingly, the curve of the inrush current and the curve of the voltage drop by the insertion resistance of the SFCL 22 are predicted by [Formula 7] and [Formula 9].

Step S400 decides a scale factor considering a coefficient of the insertion resistance which will be described later.

Step S500 finds a crossing point of a curve of a corrected inrush current, which is obtained by multiplying the inrush current by the scale factor decided in step S400, and the curve of the voltage drop by the insertion resistance; and decides the resistance of a value corresponding to the crossing point as the optimal insertion resistance of the SFCL 22 connected to the power system.

The Taylor series expansions for [Formula 7] and [Formula 9], which are used to decide the scale factor considering the coefficient of the insertion resistance of the SFCL 22, are respectively written as:

$$|I_{SFCL}| = |I_{inrush}| - \frac{|I_{inrush}|\cos(\theta_{V\_inrush} - \theta_{I\_inrush})|I_{inrush}|}{2|V_{inrush}|}R_{SFCL} + \ldots$$ [Formula 10]

$$V_{SFCL\_drop} = |I_{SFCL}|R_{SFCL} + \ldots$$ [Formula 11]

Upon comparing the term of $R_{SFCL}$ in [Formula 10] to that in [Formula 11], it is found that the term of $R_{SFCL}$ in [Formula 10] is multiplied by:

$$-\frac{|I_{inrush}|\cos(\theta_{V\_inrush} - \theta_{I\_inrush})}{2|V_{inrush}|}$$ [Formula 12]

Thus, the scale factor according to the present invention is decided by:

$$\left|\frac{2|V_{inrush}|}{|I_{inrush}|\cos(\theta_{V\_inrush} - \theta_{I\_inrush})}\right||I_{SFCL}|$$ [Formula 13]

Accordingly, when [Formula 7] is multiplied by [Formula 13], we obtain:

$$\left|\frac{2|V_{inrush}|}{|I_{inrush}|\cos(\theta_{V\_inrush} - \theta_{I\_inrush})}\right||I_{SFCL}|$$ [Formula 14]

Figure 3:
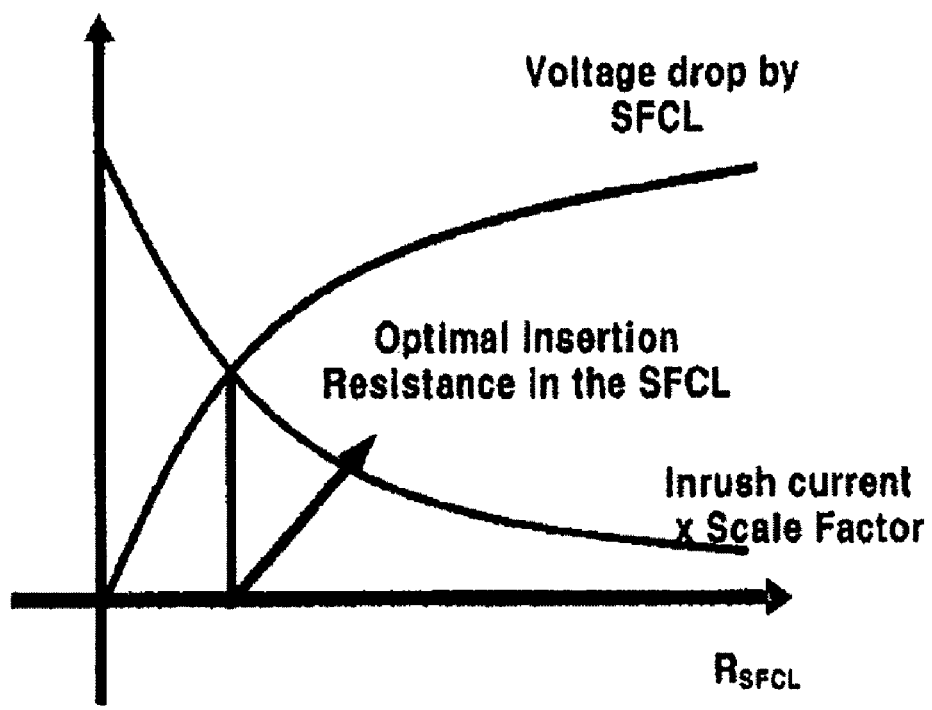
FIG. 3 is a conceptional view illustrating basic principles of the method for deciding the optimal insertion resistance of the SFCL installed in FIG. 1.

The graphs for [Formula 9] and [Formula 14] can be indicated in one plane, as shown in FIG. 3 which will be described later. In the present invention, the resistance at the crossing point is decided as the optimal insertion resistance of the SFCL 22 as described later.

The crossing point is solved by:

$$\left|\frac{2|V_{inrush}|}{|I_{inrush}|\cos(\theta_{V\_inrush} - \theta_{I\_inrush})}\right||I_{SFCL}| = V_{SFCL\_drop}$$ [Formula 15]

wherein, $$|I_{SFCL}| = \sqrt{\frac{|V_{inrush}||I_{inrush}|\angle\theta_{V\_inrush} - \theta_{I\_inrush}}{\left(R_{SFCL} + \frac{|V_{inrush}|}{|I_{inrush}|}\cos(\theta_{V\_inrush} - \theta_{I\_inrush})\right)^2 + \left(\frac{|V_{inrush}|}{|I_{inrush}|}\sin(\theta_{V\_inrush} - \theta_{I\_inrush})\right)^2}}$$

and $$V_{SFCL\_drop} = |I_{SFCL}|R_{SFCL}.$$

FIG. 3 is a conceptional view illustrating basic principles of the method for deciding the optimal insertion resistance of the SFCL 22 according to the embodiment of the present invention.

As described above with reference to FIG. 2, when the predicted curve of the inrush current multiplied by the scale factor obtained in step S400 and the predicted curve of the voltage drop are indicated in one plane, the crossing point of the two curves is always formed.

At the crossing point, the extent of decreasing the inrush current which is the advantage resulting from the insertion of the SFCL 22 is harmonized with the condition of the voltage drop by the insertion resistance which is the disadvantage resulting from the insertion of the SFCL 22.

Therefore, in the present invention, the resistance at the crossing point is determined as the optimal insertion resistance of the SFCL 22 to the power system.

Figure 4:
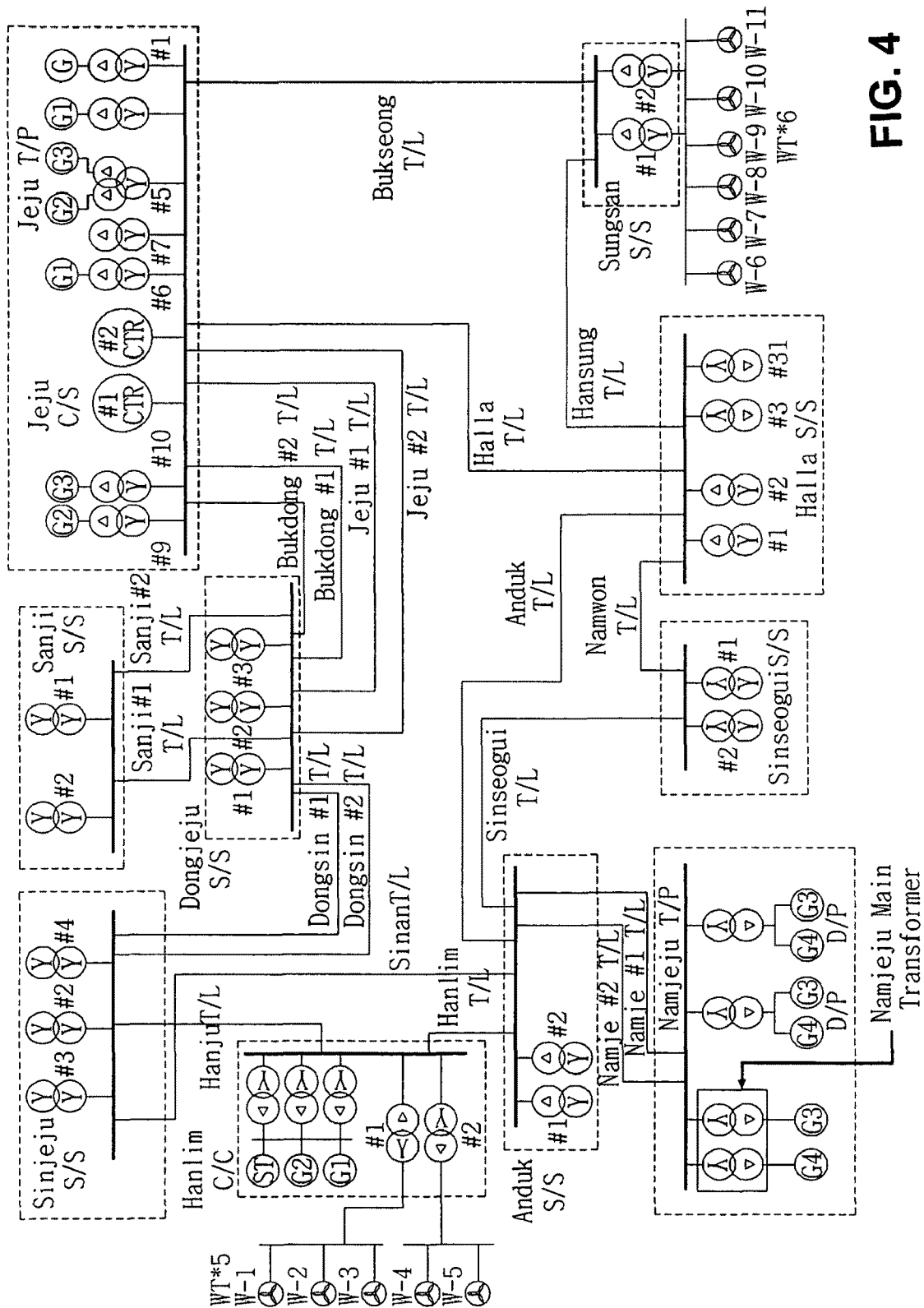
FIG. 4 is a Jeju power system model to decide the optimal insertion resistance of the SFCL, based on the method of FIG. 2.

FIG. 4 illustrates a Jeju power system model as the simulation power system to verify the method for deciding the optimal insertion resistance of the SFCL 22 according to the embodiment of the present invention.

In the Jeju power system, assuming that the inrush current occurs in the main transformer of the Namjeju thermo power plant, the simulation is performed with respect to the decrease of the inrush current by using the SFCL 22.

Hereinafter, all simulation is performed using electromagnetic transients program-restructured version (EMTP-RV) as power system transient phenomenon software.

Figure 5:
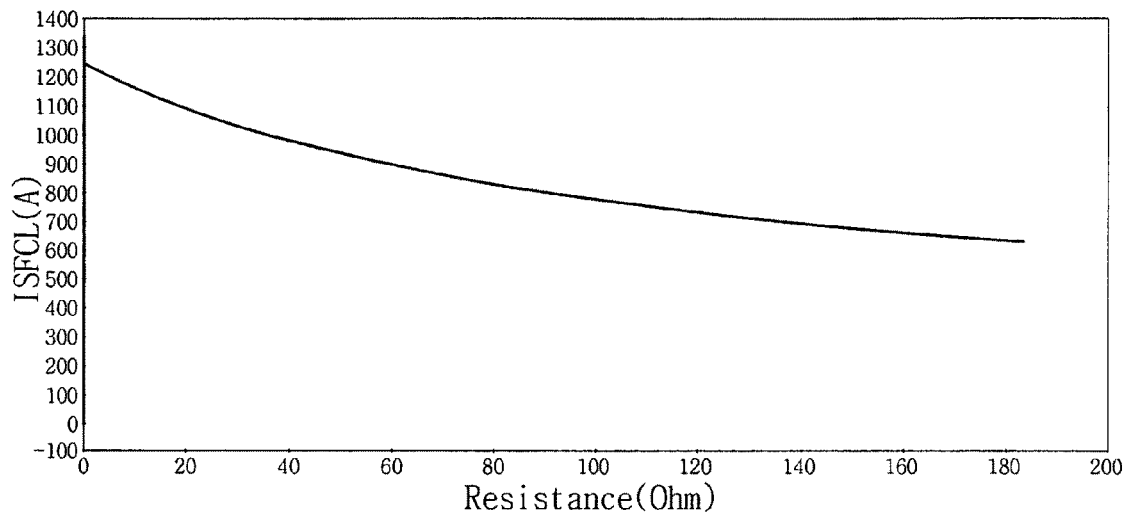
FIG. 5 is a graph illustrating a result of predicting a curve of the inrush current according to the insertion resistance of the SFCL in the model of FIG. 4.

FIG. 5 illustrates the curve of the inrush current according to the insertion resistance of the SFCL 22 which is predicted by [Formula 7] using the data obtained from the power system model of FIG. 4.

Figure 6:
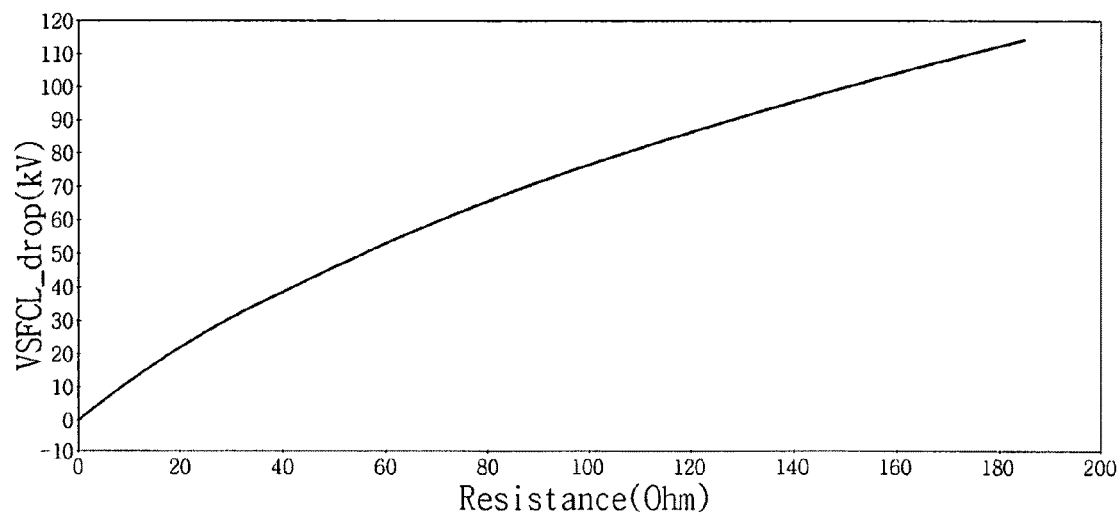
FIG. 6 is a graph illustrating a result of predicting a curve of voltage drop according to the insertion resistance of the SFCL in the model of FIG. 4.

FIG. 6 illustrates the curve of the voltage drop according to the insertion resistance of the SFCL 22 which is predicted by [Formula 9].

Figure 7:
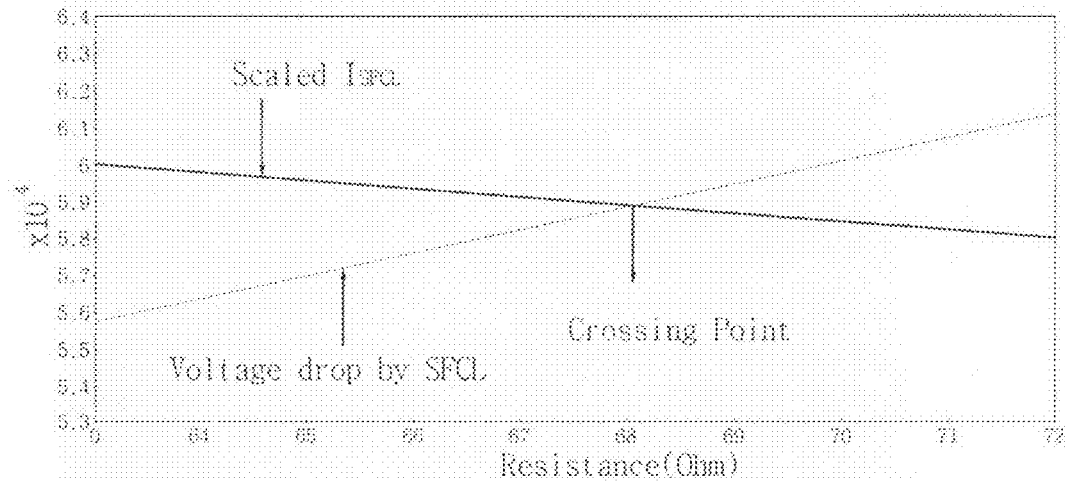
FIG. 7 is a graph illustrating a result of deciding the insertion resistance through the prediction of a crossing point of the inrush current x scale factor and the curve of the voltage drop by the insertion resistance in the model of FIG. 4.

When the curve of the inrush current, which is obtained by multiplying the value of [Formula 7] by the scale factor solved by [Formula 13], and the curve of the voltage drop by the insertion resistance are indicated in one plane, the result is shown in FIG. 7.

As described above, the crossing point always exists in the graphs of FIG. 7. In the simulation of FIG. 7, since the resistance at the crossing point is 67.94Ω, the optimal insertion resistance of the SFCL 22 in the Jeju power system model is determined as 67.94Ω.

Figure 8:
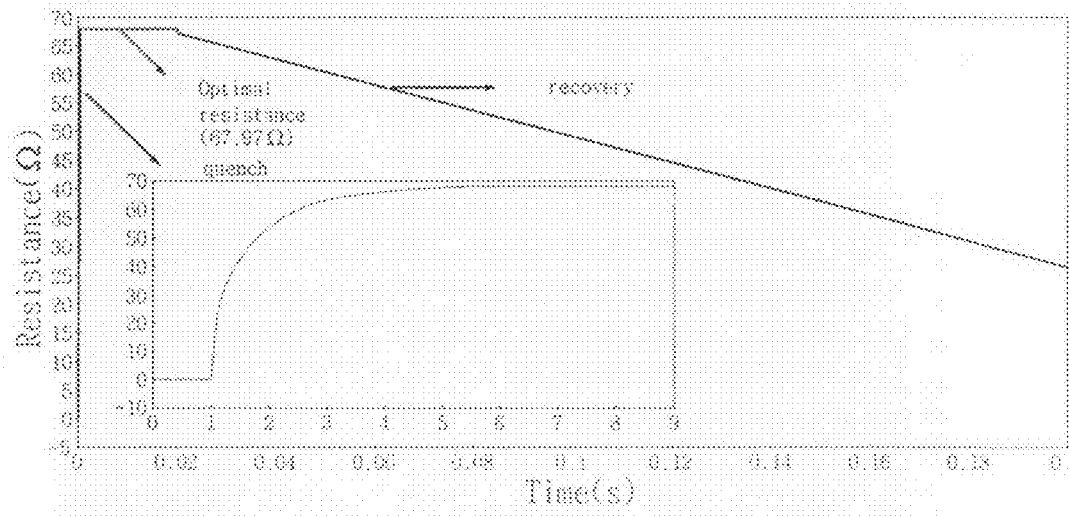
FIG. 8 is a graph illustrating operation characteristics of the SFCL when the optimal insertion resistance of the SFCL is applied to the model of FIG. 4.

FIG. 8 is a graph illustrating the operation characteristics of the SFCL 22 which is designed, based on the optimal insertion resistance obtained in FIG. 7.

Since the inrush current generates at the same time when the simulation starts, the quenching characteristics of the SFCL 22 show immediately after the simulation starts, so that the resistance value increases to reach 67.94Ω.

Meanwhile, the inrush current decreases as time goes by and, when the current applied to the SFCL 22 becomes less than the threshold current, the resistance value progressively decreases by the recovery characteristics of the superconductor.

Figure 9:
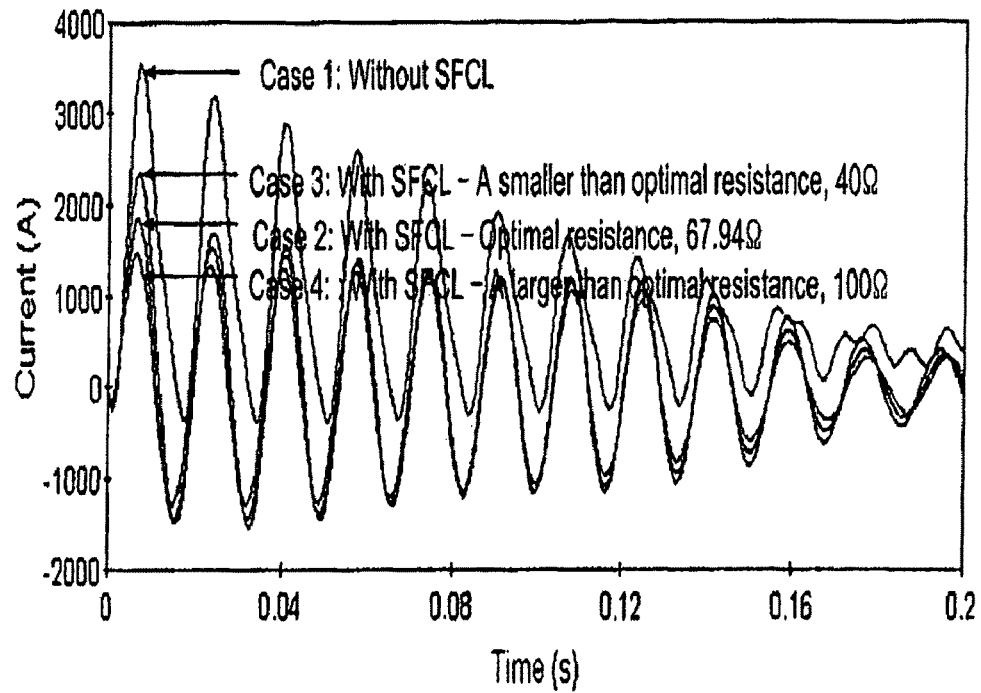
FIG. 9 is a graph illustrating a waveform of an instantaneous value of the inrush current according to the insertion resistance of the SFCL in the model of FIG. 4.

FIG. 9 illustrates the results of simulating an instantaneous value of the inrush current according to the insertion resistance of the SFCL 22 applied in the embodiment of the present invention.

To verify the efficiency of the method for deciding the optimal insertion resistance disclosed in the present invention, the simulation is performed with respect to the following four cases in the Jeju power system model of FIG. 4:

Case 1: where the SFCL is not connected to the power system

Case 2: where the optimal insertion resistance (67.94Ω) is applied

Case 3: when the resistance (40Ω) less than the optimal insertion resistance is applied Case 4: when the resistance (100Ω) greater than the optimal insertion resistance is applied In FIG. 9, when the SFCL 22 is applied, it is confirmed that the inrush current decreases. As shown in Table 1 below, the decrease rate is greatest in Case 4 among the four cases, which is followed by Case 2.

TABLE 1

Decrease rate of inrush current in four cases

| Case No. | Maximum rms value of inrush current (A) | Decrease rate (%) |
|---|---|---|
| Case 1 | 1947 | 0 |
| Case 2 | 1197 | 38.5 |
| Case 3 | 1414 | 27.4 |
| Case 4 | 990 | 49.2 |

Figure 10:
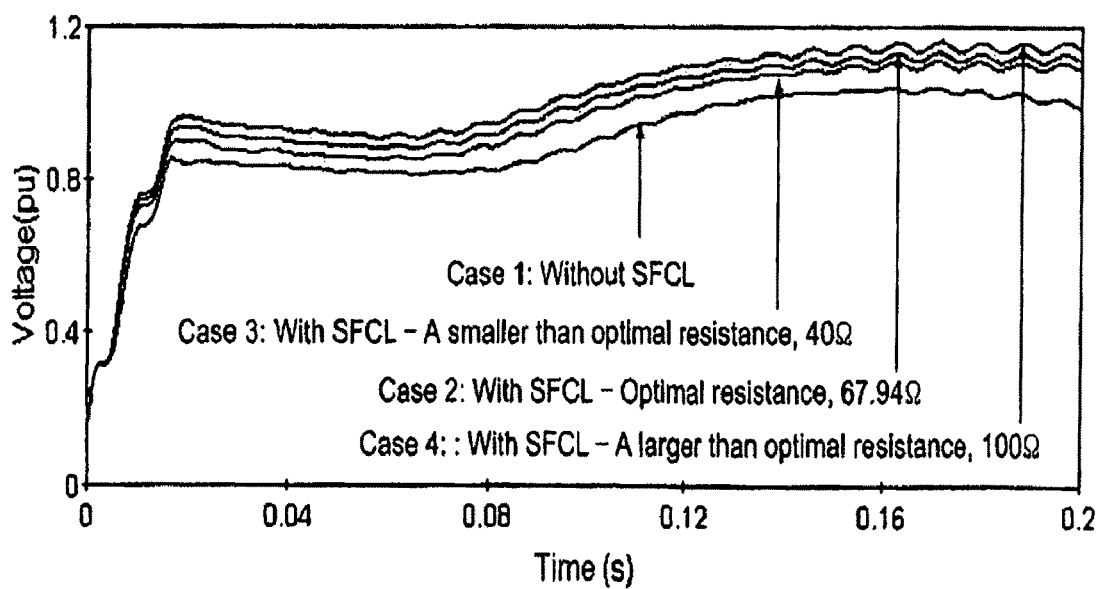
FIG. 10 is a graph illustrating a waveform of a bus voltage according to the insertion resistance of the SFCL in the model of FIG. 4.

FIG. 10 illustrates the results of obtaining the bus voltage to verify the validity of the present invention. The simulation is performed with respect to the following four cases, like FIG. 9.

In FIG. 10, when the SFCL 22 is applied, it is confirmed that voltage compensation is made for the voltage drop by the inrush current.

Specifically, as shown in Table 2 below, the voltage compensation for the voltage drop is greatest in Case 4, which is followed by Case 2.

TABLE 2

Voltage compensation for bus voltage drop in four cases

| Case No. | Bus voltage (per unit, PU) | Voltage compensation |
|---|---|---|
| Case 1 | 0.808 | 0 |
| Case 2 | 0.877 | 0.069 |
| Case 3 | 0.845 | 0.04 |
| Case 4 | 0.905 | 0.097 |

In Case 4, when the SFCL 22 is applied, the voltage at the recovery time of the superconductor increases by 1 PU or more. This is because the bus voltage increases against the voltage drop according to the insertion resistance of the SFCL 22, so that the power system maintains the complex power.

In this case (i.e., Case 4), the voltage increase is greater than the optimal insertion resistance and the recovery time becomes longer, thereby deteriorating the power quality of the system.

However, in the optimal insertion resistance of Case 2, the voltage is not greater than the setting value of the over-voltage relay, and the voltage is recovered by 1 PU as the resistance decreases by the recovery characteristics of the superconductor. Therefore, Case 2 does not cause the aforementioned problem of Case 4.

Consequently, in Case 2 having the optimal insertion resistance which is calculated by the method for deciding the optimal insertion resistance according to the present invention, the decrease rate of the inrush current generated when the SFCL 22 is used and the influence of the voltage drop according to the insertion resistance are most appropriately considered.

As described above, in the apparatus for decreasing the inrush current in accordance with the present invention, when the current of the power system is in excess of the threshold current, resistance is inserted by the physical characteristics of a superconductor. Therefore, the inrush current is promptly decreased.

Furthermore, in the apparatus for decreasing the inrush current in accordance with the present invention, after the apparatus/the SFCL is installed in the power system, no special controlling or switching operation is needed. Therefore, the power system is easily protected and the reliability of the power system is easily secured.

Furthermore, the optimal insertion resistance of the SFCL for decreasing the inrush current in accordance with the present invention is determined to have the optimal resistance value considering the increase rate of the inrush current and the voltage drop by the insertion resistance, by using the inrush current generated before the SFCL is inserted and the optimal bus voltage. Therefore, the power system is efficiently operated according to the characteristics of the power system.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. An apparatus for decreasing an inrush current using a superconducting fault current limiter, comprising:
   a power system including a transformer; and
   a superconducting fault current limiter electrically connected to the transformer, for decreasing the inrush current generated in the power system,
wherein a value of insertion resistance of the superconducting fault current limiter is calculated by using a variation curve of the inrush current in the power system according to the insertion resistance and a variation curve of voltage drop according to the insertion resistance to decrease the introduced inrush current and rapidly restore a resistance value of the super conducting body after the inrush current is removed, and
   wherein the value of the insertion resistance is a resistance value at a crossing point of the variation curve of the inrush current according to the insertion resistance and the variation curve of the voltage drop according to the insertion resistance.

2. The apparatus according to claim 1, wherein the crossing point is a crossing point of a variation curve of a corrected inrush current obtained by multiplying the variation curve of the inrush current according to the insertion resistance by a given scale factor and the variation curve of the voltage drop according to the insertion resistance.

3. The apparatus according to claim 2, wherein the variation curve of the inrush current and the variation curve of the voltage drop are solved by using the inrush current and bus voltage of the power system before the superconducting fault current limiter is inserted.

4. The apparatus according to claim 2, wherein the scale factor is solved by using the inrush current and bus voltage of the power system before the superconducting fault current limiter is inserted.

5. The apparatus according to claim 1, wherein the variation curve of the inrush current and the variation curve of the voltage drop are solved by using the inrush current and bus voltage of the power system before the superconducting fault current limiter is inserted.

6. The apparatus according to claim 1, wherein the variation curve of the inrush current and the variation curve of the voltage drop are solved by using the inrush current and bus voltage of the power system before the superconducting fault current limiter is inserted.

7. A method for deciding a value of insertion resistance of a superconducting fault current limiter for decreasing an inrush current of a power system, comprising:
   a first step of solving a variation curve of the inrush current of the power system and a variation curve of voltage drop according to insertion resistance of the superconducting fault current limiter; and
   a second step of solving a value of insertion resistance of the superconducting fault current limiter by using the variation curve of the inrush current and the variation curve of the voltage drop.

8. The method according to claim 7, wherein the second step decides a crossing point of the variation curve of the inrush current and the variation curve of the voltage drop as the value of the insertion resistance.

9. The method according to claim 8, wherein the second step decides a crossing point of a variation curve of a corrected inrush current obtained by multiplying the variation curve of the inrush current solved in the first step by a given scale factor and the variation curve of the voltage drop as the value of the insertion resistance.

10. The method according to claim 9, wherein the variation curve of the in current and the variation curve of the voltage drop in the first step are solved by using the inrush current and bus voltage of the power system before the superconducting fault current limiter is inserted.

11. The method according to claim 9, wherein the scale factor is solved by using the inrush current and bus voltage of the power system before the superconducting fault current limiter is inserted.

12. The method according to claim 8, wherein the variation curve of the inrush current and the variation curve of the voltage drop in the first step are solved by using the inrush current and bus voltage of the power system before the superconducting fault current limiter is inserted.

13. The method according to claim 7, wherein the variation curve of the inrush current and the variation curve of the voltage drop in the first step are solved by using the inrush current and bus voltage of the power system before the superconducting fault current limiter is inserted.

* * * * *